United States Patent [19]

Rhein

[11] 4,070,291
[45] Jan. 24, 1978

[54] METHOD AND APPARATUS FOR ACCELERATING THE CRYSTALLIZATION AND REMOVAL OF TARTAR FROM WINE

[75] Inventor: Otto R. Rhein, Wiesbaden-Dotzheim, Germany

[73] Assignee: Henkell & Co., Wiesbaden-Biebrich, Germany

[21] Appl. No.: 689,478

[22] Filed: May 24, 1976

Related U.S. Application Data

[62] Division of Ser. No. 508,740, Sept. 24, 1974, Pat. No. 3,988,486.

[51] Int. Cl.$^2$ .................. B01D 13/00; B01D 21/24; B01D 23/20
[52] U.S. Cl. .................. 210/115; 210/321 R; 210/259; 210/433 M
[58] Field of Search .................. 210/23 H, 23 F, 321, 210/44, 115, 259, 433 M; 426/15; 204/186

[56] References Cited

U.S. PATENT DOCUMENTS

| | | | |
|---|---|---|---|
| 1,162,212 | 11/1915 | Bloom | 204/186 X |
| 2,519,606 | 8/1950 | Sharp | 210/44 X |
| 3,228,876 | 1/1966 | Mahon | 210/321 X |
| 3,741,770 | 6/1973 | Olphen | 426/15 |
| 3,856,569 | 12/1974 | Strong | 210/23 X |

FOREIGN PATENT DOCUMENTS

| | | | |
|---|---|---|---|
| 2,050,917 | 4/1972 | Germany | 210/321 |

Primary Examiner—Frank A. Spear, Jr.
Assistant Examiner—David R. Sadowski
Attorney, Agent, or Firm—Stanley J. Price, Jr.

[57] ABSTRACT

A tartarous beverage, such as wine, containing a tartrate to be removed therefrom is conveyed from a storage container through a conduit under pressure into a first module having a semipermeable membrane. The semipermeable membrane forms two streams, a tartrate-free permeate and a concentrate containing a solution of said tartarous beverage and tartrate. The permeate stream is directed from the module through a conduit to a delivery tank. The concentrate may then be conveyed from the first module to a plurality of modules that are serially connected to each other. Each of the modules has an outlet that is connected by an intermediate conduit to an inlet of the adjacent module for the passage of the solution therethrough. The permeate stream exits from each of the modules and is collectively conveyed to the delivery tank. The concentrate is directed through the modules to provide a stronger concentration of the tartrate in the solution. The concentrate is then conveyed to a crystallizer where tartrate crystals are formed. Thereafter, the tartrate crystals are filtered from the tartarous beverage and the tartarous beverage is conducted tartrate free to the delivery tank to be admixed with said permeate to form a tartrate-free beverage. In another embodiment, an inert gas, such as nitrogen, is introduced into the flow of the supersaturated solution to form a plurality of bubbles entrained in the solution to accelerate the tartrate crystallization.

4 Claims, 3 Drawing Figures

METHOD AND APPARATUS FOR ACCELERATING THE CRYSTALLIZATION AND REMOVAL OF TARTAR FROM WINE

CROSS REFERENCES TO RELATED APPLICATIONS

This application is a division of copending application Ser. No. 508,740 filed on Sept. 24, 1974, entitled "Method And Apparatus For Accelerating The Crystallization And Removal Of Tartar From Wine", now U.S. Pat. No. 3,988,486.

BACKGROUND OF THE INVENTION

1. Field of the Invention

The invention relates to a method and apparatus for crystallizing tartar during the production of wine and removing the tartar in crystal form from the wine and more particularly to a method and apparatus for accelerating the crystallization of tartar.

2. Description of the Prior Art

Wine, and also champagne produced from wine, contain a salt formed in the grape during the growth that mainly consists of potassium hydrogen tartrate and will hereinafter be referred to as tartar. The content of tartar in grapes or grape must depends largely on the degree of ripeness of the grapes. Generally, as far as tartar is concerned, grape must represents a saturated or almost saturated solution of tartar. Solubility of tartar in must and in wine depends on a number of factors. The major factors include the alcohol content of the wine and the temperature. As soon as the grape must is subjected to fermentation and the formation of alcohol, the solubility of the tartar is lowered substantially. The original saturated solution after alcoholic fermentation provides a supersaturated solution of tartar. The surplus of tartar is removed by the formation of tartar crystals as soon as conditions are suitable. After elimination of the surplus tartar as crystals, each wine again represents a saturated solution of tartar.

Since the solubility of tartar in wine depends on temperature, a surplus of tartar will always develop if the wine is exposed to a lower temperature. The excess or surplus tartar is again eliminated through crystal formation as soon as suitable conditons are present. Further fermentation of wine to champagne decreases the solubility for tartar because of the renewed alcohol formation and, therefore, creates a new surplus of tartar.

The presence of tartar crystals in a bottle of wine is objected to by the buyer although the tartar crystals have no deletrious effect. Therefore, the wine producer is required to eliminate the tartar surplus during the production or processing stage of the wine so that tartar crystals are not present and will not form in closed bottles of wine.

Conventionally, the prevention of tartar formation in closed bottles is accomplished by cooling the wine for a long period of time, as for example five or ten days at a low temperature of $-4°$ or $-5°$ C. During that time, crystallization of the surplus tartar is more or less complete and the tartar crystals are separated from the wine by conventional separators or filters.

Another method of removing the tartar surplus is by cation exchange to render the insoluble surplus into soluble compounds. It is also possible, with the aid of electrodialysis, to remove the surplus of tartar from the wine.

The legal requirements for treating wine, the organoleptic properties such as taste and bouquet and commercial feasibility have to be considered in determining which method is to be employed for removal of the surplus tartar. The object of this invention is, therefore, to provide a method for tartar elimination from wine that is superior from the above-described processes. According to the invention, the surplus tartar is eliminated by means of reverse osmosis.

During the reverse osmosis, with the aid of high pressures against the direction of osmotic pressure, one forces the water or other easily permeating components of a solution through a semi-permeable membrane. For convenience, the portion that penetrates through the membrane will be referred to as the permeate, and the liquid portion retained by the membrane will be referred to as the concentrate.

With the aid of reverse osmosis, industrially ocean water or brackish water is prepared for drinking purposes. In the chemical industry, solutions are cleaned or purified by reverse osmosis and other solutions are concentrated. The interest is, therefore, either for the permeate, where the concentrate is rejected, or the interest is for the concentrate when the permeate is rejected.

It has been discovered that by reverse osmosis concentration the tartar crystals automatically develop and are present in the concentrate from which they can be easily eliminated. A procedure was developed from this observation to provide a new method of tartar elimination from wine by the use of reverse osmosis.

SUMMARY OF THE INVENTION

This method, in accordance with the present invention consists of dividing the wine temporarily into permeate and concentrate fractions by means of reverse osmosis. The crystals in the concentrate are separated therefrom by either subjecting the concentrate to a filtering or sedimentation process. After the crystals are removed from the concentrate, both the permeate and concentrate are reunited. The wine end product differs mainly from the wine introduced into the process only by the purely physical method of removing the surplus tartar from the wine.

By comparison with the presently known methods for the removal of tartar, the result is as follows. The treatment with cation exchangers has not been permitted to this date and for the basic wines destined for champagne, the treatment by cation exchangers has been granted only for short periods. The reverse osmosis being a purely physical method, is permitted for the treatment of food and beverages without limitation. The wine, that has been treated by reverse osmosis, can in an organoleptic sense be at least equivalent with the wine treated by cation exchangers. It is, however, a wine to be preferred to a wine that has been treated by removal of tartar by low temperatures or electrodialysis. The reverse osmosis process, in an economical aspect, provides the greatest certainty for eliminating the surplus tartar from the wine at a lower cost than is possible with the cold treatments or electrodialysis.

The described method can be improved further by compensating for the resulting loss of substances which may include adding relatively pure tartaric acid or a pure salt of tartar to the wine, preferably before the treatment with reverse osmosis. With this procedure, the changes caused by the removal of the tartar will be compensated for in both the flavor and in the analytical aspect of the wine. The separation of the wine or effervescent wine, such as champagne into a concentrate or permeate by means of reverse osmosis can also be employed to additionally treat the wine for improving its properties and stabilizing the wine. For example, the carbonated wine or champagne made during the separation can have phosphor compounds removed therefrom or the acidity can be reduced where desired.

The process for expediting the crystallization and tartar elimination by osmosis is a continuous process and has many economic advantages. The process is characterized by, that at least one module is provided for reverse osmosis with an inlet connected to a pressure producing device, a concentrate outlet conduit and a permeate outlet or collector conduit, a regulating valve is provided to control flow through the conduits and crystal separator removes the tartar crystals from the concentrate. A metering device in the permeate collector conduit is arranged to measure the amount of flow and both the collector conduit outlets are connected to a common delivery conduit.

A module for the reverse osmosis includes a semipermeable membrane of any suitable construction, as for example, a known pipe module or a disc module. In the module, the wine that is conveyed in under pressure is divided into two streams, one of which contains the salt-free permeate and the other stream containing the salt, mainly the tartar concentrate. Since this division into partial streams is continuous, a preselected amount of wine can be treated without interruption of the process and the concentrate may also continuously have the tartar removed therefrom and both of the separated streams may be united to provide a now purified wine with the collected volume of wine corresponding to substantially the original volume. Regulating means, such as a valve in the concentrate collector may be provided to regulate the amount of flow through the concentrate collector and also through the permeate collector.

A preferred form of the hereindescribed method is characterized by several modules which may be switched on in series, one after the other, the concentrate exit of the preceeding module connected with the inlet of the adjacent module by means of an intermediate conduit and the permeate exits from both modules being connected to the permeate collector conduits. This series switching of two or more modules expedites the extraction of tartar and achieves a stronger concentration of the tartar in the concentrate. There is a further advantage when there is provided in the intermediate conduit, at least one device, such as a pump for increasing the pressure of the liquid flowing in the conduit. The pressure from the pump can be easily controlled.

There is a further advantage of providing a concentrate exit that is connected to a branch conduit leading to a suitable entry to the module. This recirculation of a portion of the concentrate increases the concentration of the concentrate to improve the crystal separation therefrom. A regulating valve can also be positioned in the branch conduit and, by suitably choosing the amount of concentrate recycled through the branch conduit, the flow of the stream in the modules can be increased to avoid sedimentation in the modules.

Extraction of the tartar from the concentrate can be accomplished in any desired manner, as for instance by sedimentation or filtration. However, it is preferable to provide in the concentrate collector conduit a crystallizer whose volume is calculated for the duration of the holdup time of the concentrate. It is preferable that the crystallizer is suitable for growing microcrystals of easily filtered size. It is also advantageous to provide a filter in the concentrate collector conduits.

The desired ratio of concentrate and permeate in the delivery conduit can be maintained by providing a regulating valve in the concentrate collector conduit that is controlled independently from the amount of flow in the permeate collector conduit. Known control devices can be used to control the regulating valve.

The crystallization of crystal forming substances of supersaturated solutions as for example, tartar crystallization can be delayed and perhaps eliminated by the presence of crystallization inhibitor. With tartar, however, the kalium ion has a substantial mobility and is readily crystallizable while the tartaric acid ions is slow moving and crystallization is hindered by other materials. Therefore, if crystallization inhibitors surround the kalium ions or the tartaric acid ions, it is difficult for the crystallization of the tartaric acid ions to take place unless the other readily crystallizable compounds are pushed directly to the center of the kalium ion.

If the crystallization partners, i.e., the kalium ion and the tartaric acid ions, are in the space between the gas and fluid where the rearrangement of the tartaric acid ions is incomplete, the frequency of the crytallization partners meeting is much greater than in the middle of the fluid. Proceeding from this observation, the invention sees an additional method for increasing the speed of crystallization in that the supersaturated solution is intermingled with gas bubbles.

If an inert gas, as for example, nitrogen is introduced into the flow of a supersaturated solution and is finely distributed therein so that a plurality of bubbles are formed or a foam is produced, there is introduced into the supersaturated solution an increased boundary surface that increases the probability of the crystallization partners meeting and increases substantially the crystallization process.

This method offers an advantage in that it is also suitable for both the cooling and electrodialysis processes and can be used for solutions that have not been subjected to these processes. It is therefore, especially suitable for further developments with the above described reverse osmosis process since the concentrate obtained can be subjected to the gas bubbles and, therefore, induce quicker crystallization. The inert gas preferred for the production of the gas bubbles is one that avoids undesired reactions so that further treatments to the liquid would not be required. Nitrogen is a particularly suitable gas for producing gas bubbles in the elimination of tartar in wine. With the use of nitrogen, the gas may be recovered and again introduced into the process because it is inert.

For the introduction of the gas bubbles according to the invention, there is provided an arrangement in which the supersaturated solution is conveyed through a gas flow conduit that contains a gas distributor. The gas distributor is, in turn, connected to a source of gas. The outlet of the gas flow conduit is connected to a crystallizer and the crystallizer is, in turn, coupled to a filter at the outlet for the gas. This arrangement permits a continuous process for removal of the tartar crystals. The supersaturated solution is permeated with the gas bubbles in the gas flow conduit and the gas distributor can be in the form of a sieve, plastic web, ceramic fit, or the like, so that the gas supplied from the gas source or the return conduit is introduced into the solution in minutely distributed bubbles. Subsequently the supersaturated solution permeated by the innumerable minute bubbles of gas flows to the crystallizer. The crystals can then be removed by the filter and provide an important side product. Also, there is an outlet provided at the filter for the treatment of gas which may be recycled through the process.

A conduit may be connected to the gas outlet of the filter and a suction pump may be provided in the conduit that circulates the gas back to the gas distributor. To avoid withdrawal of fluid or particles when removing the gas by suction, it is advantageous to connect a separator for fluids on the gas outlet of the filter.

Another feature according to the invention may be utilized to eliminate the disadvantages of the crystallization inhibitors and other materials. This feature can be used in place of the previously described feature of using gas bubbles. This feature consists of exposing the supersaturated solution to an alternating current. The treatment of the supersaturated solution with an alternating current can be utilized in connection with the previously described treatment of the wine by reverse osmosis. The formation of crystals in the concentrate recovered by reverse osmosis can be expedited by the effect of the alternating current. Other pretreatments, for example, electrodialysis can also preceed the alternating current treatment. The alternating current treatment, when desired, can be considered as an independent treatment, not requiring a pretreatment of the supersaturated solution and can provide desirable results.

The mechanism for the increased crystallization process with the aid of alternating current is as follows. The self-moving ion forming crystals are not normally oriented in that the direction of movement of the ions is random. The probability of the crystallization components meeting is minute. If, however, two electrodes are positioned on the treatment container or on a flow-through conduit for the solution to be treated, the movement of the crystallization components is increased and are forced into oriented movement by the influence of the alternating current that is reversed with each cycle. Thus, the ions are forced to execute so-called to and fro movements in a parallel line. Because of this controlled movement, the frequency of the crystallization components meeting is considerably increased and, therefore, the crystallization of the process is increased to a substantial degree.

According to the preferred embodiments, the supersaturated solution should be subjected to an alternating current whose frequency resides between about 50 and 2,000 Hertz. Any chosen frequency can be used depending on the type of solution to be treated. This depends on both the amount of current and the pressure. The electric forces are so measured that the speed of the crystallization components remain below a primary value which if exceeded, would make the meeting of the crystallization components difficult because of the relative speed of the crystallization components.

An arrangement suitable for the treatment of a supersaturated solution with alternating current is characterized by a connection at the inlet for the supersaturated solution that is connected with a pipe or conduit to which at least two electrodes are connected. These electrodes are connected to a source of alternating current and are arranged so that an alternating field is created within the conduit. The outlet of the treatment conduit to which the electrodes are connected is connected to a crystallizer. A filter is coupled at the outlet end of the crystallizer for the separation of the crystals. The filter is preferably connected with an outlet connection for the solution that has been freed of crystals.

The arrangement of the above process may also be utilized in subjectng the supersaturated solution to a current as it is flowing between two containers. There can also be provided a recirculating conduit for repeated treatment of the fluids. The fluid can be treated continuously with this arrangement in such a manner that the solution, after passing through the treatment conduit is conveyed to a crystallizer or to a crystal development container in order to let the induced microcrystals grow and thereafter remove the microcrystals. Between the alternating current source and the electrodes, it is preferred to provide a frequency transformer that furnishes the desired frequency and can be adjusted by means of a suitable switching device to a given frequency.

Further details and characteristics of the invention will be found in the following description of examples and in the schematic drawings.

DESCRIPTION OF THE PREFERRED EMBODIMENTS

The expression "wine" used in the following description is also intended to include effervescent or foam-like wines such as champagne and the like. It should also be noted that the invention is not intended to be limited to the production of these particular wines but is also suitable for the production of tartarous beverages and generally for expediting the crystal formation of supersaturated solutions.

Figure 1:
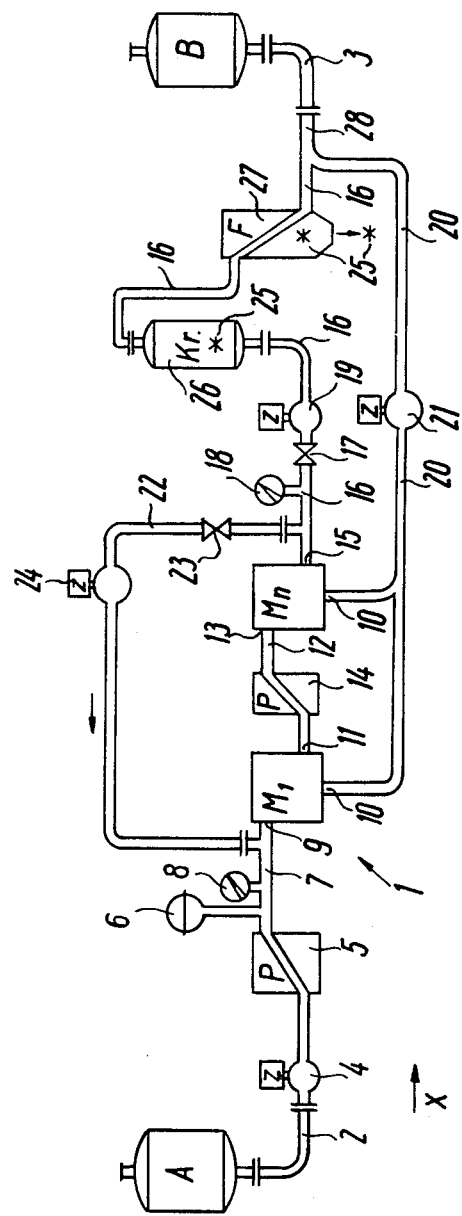
FIG. 1 is a schematic arrangement for providing reverse osmosis for the wine.

In FIG. 1 there is generally designated by the numeral 1, apparatus for eliminating the tartar from wine. The apparatus can be connected by means of conduits 2 and 3, to a container A for the wine to be treated and to a container B for the treated wine. The arrow X indicates the direction of flow from container A to container B.

The wine from container A first flows through a metering device 4 to determine the amount of flow through the conduit 2 and the wine is thereafter conveyed through a conduit to the high pressure pump 5. The pump 5 pressurizes the wine prior to its introduction into the first module and can, if desired, have an air chamber or diaphragm to compensate for the pulsations of the pump 5. Also, in the delivery conduit 7 from the pump 5, there is provided a monometer to regulate the pump pressure and to maintain the desired pressure at inlet 9 of first module $M_1$.

Module $M_1$ contains, as previously stated, a semipermeable membrane permitting practically tartar-free wine to pass therethrough. The tartar-free wine is conveyed from permeate exit 10 into conduit 20 while the portion of the wine remaining on the other side of the membrane and therefore, richer in tartar will be discharged from the module at the concentrate exit 11. Module $M_1$ has another module $M_2$ coupled at the outlet thereof so that the intermediate conduit 12 connects the concentrate exit 11 of the first module $M_1$ with the inlet of the second module $M_2$. It should be understood, however, that within the framework of the invention a plurality of modules can be provided which each affects a further increase of the concentration of the concentrate. Between individual modules, there can be provided apparatus for increasing the pressure of the concentrate as illustrated in FIG. 1 by pump 14 positioned in the intermediate conduit 12. Several of these pumps can be positioned in an intermediate conduit in series, to increase the pressure at the inlet of a module and therefore, also to increase the reverse osmosis. At the permeate outlet 11 of the last module, i.e. outlet 15 of module $M_n$, there is a concentrate collector conduit 16 in which the flow of the concentrate is regulated by a valve 17. A monometer 18 shows the desired pressure and an indicator 19 will indicate the desired amount of flow through the conduit 16.

Permeate outlets 10 of all modules are connected to a permeate collector conduit or conductor 20 in which there is positioned a flow indicator 21. The sum on flow indicators 19 and 21 for the concentrate and permeate should correspond substantially to the indicator 4 showing the amount of liquid introduced into the system.

A branch conduit 22 is attached to the concentrate outlet 15 of the last module and this conduit will, by means of a regulating valve 23 permit a partial stream of the concentrate which is determined by the indicator 24 to be recycled and again introduced into the first or any other module.

A crystallizer 26 of conventional construction, is connected to the concentrator collector duct 16 and is arranged so that during the time that the concentrate flows therethrough, a substantial growth of microcrystals develops. The crystallizer 26 can be provided with a cooling tower and with a removal device for the formed crystals (not shown). The crystals being indicated by the asterisk 25. The extraction of the tartar crystals can also be made by sedimentation or by a filter 27 that is connected at a suitable location in the concentrate collector conduit 16 before the concentrate reaches the delivery conduit 28, so that the wine with the tartar removed therefrom can be reunited with the collected permeate from collector conduit 20. The stabilized wine flows from the delivery conduit 28 into a container B that is similar to container A and is possible to connect to the apparatus generally designated by the numeral 1 by means of pipes of similar connections.

Figure 2:
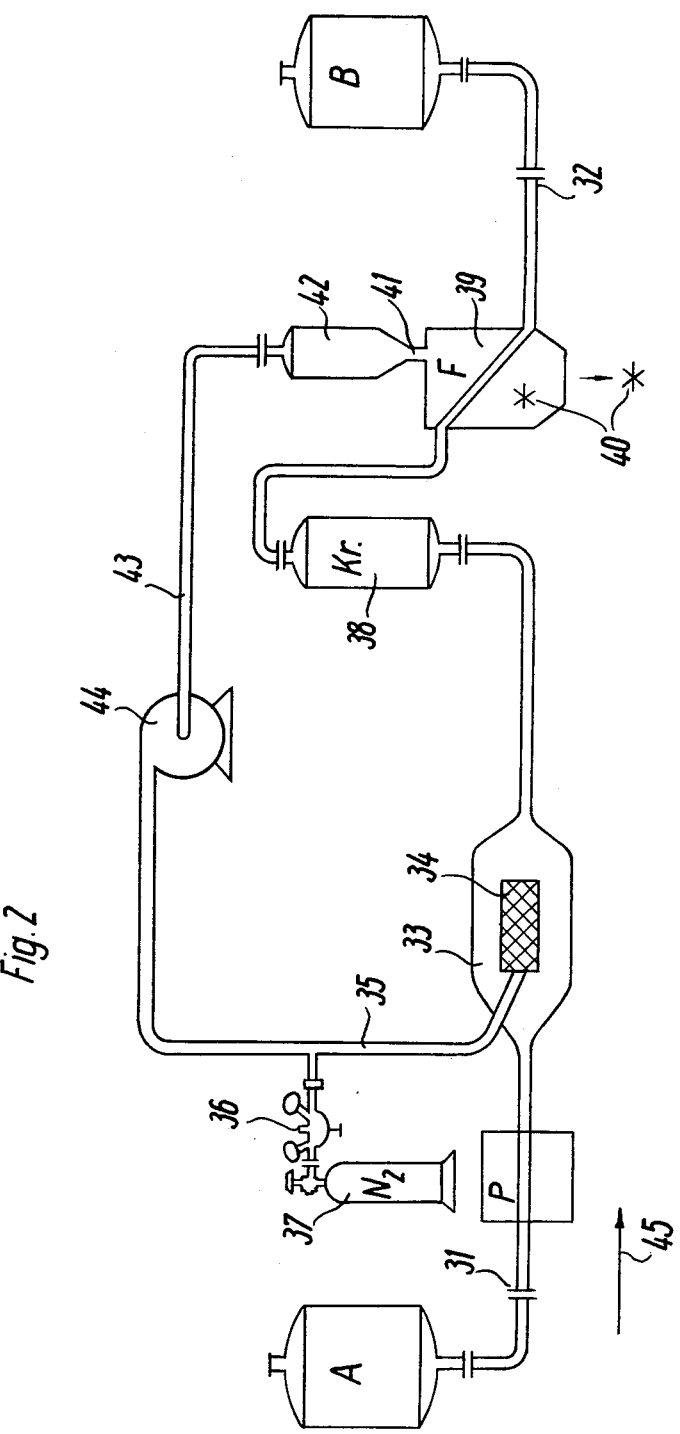
FIG. 2 is a flow diagram for permeating the supersaturated solution with gas bubbles.

Container A is again illustrated in FIG. 2 that received the supersaturated solution that is to be treated to remove the tartar therefrom. At the other end of the apparatus illustrated therein, there is a suitable container B which receives the wine substantially free of tartar. The apparatus for the above-described methods can also be connected to a flow-through conduit. The connections 31 for connecting the apparatus to a flow-through conduit are schematically illustrated as also connections 32 for a pipe to connect the outlet of the apparatus to a similar flow-through conduit.

The connection 31 in FIG. 2, for the conduit leads to a pump P that draws the wine from the container A and pumps the wine into a gas conduit 33 where there is provided a widened flow-through container in the feed conduit. In the gas flow conduit 33, there is a gas distributor 34 which is, in turn, connected to a gas conduit 35. Conduit 35 is in turn connected to a nitrogen container 37 that has a control valve 36. Gas distributor 34 distributes the gas supplied by conduit 35 from container 37 into the wine flowing through the gas distributor conduit 33 in an extremely fine form of bubbles.

The supersaturated solution of wine now filled with the fine gas bubbles, is then conveyed into the crystallizer 38. The crystals, which were produced initially, as by reverse osmosis or the like, are permitted to grow to filterable crystal size. A filter 39 is connected to the crystallizer 38 and the crystals indicated by the asterisk 40 are filtered off in the filter 39. Further, the filter 39 has an outlet 41 provided for the treating gas and a fluid separator 42. A gas recirculating conduit 43 conveys the reclaimed gas from the filter to the conduit 35. A conduit 43 contains a suction pump 44 that first provides for conveying the nitrogen or inert gas from the filter 39 through the fluid separator 42 and conveys the recycled inert gas to the distributor 34 under the desired pressure.

The wine that has the tartar removed therefrom in filter 39 flows through a conduit to the connection 32 into the container B. The direction of flow of the wine is indicated by the arrow 45. Since the gas recovered during the process through return conduit 43 is again being used in the process, the gas source 37 is for practical purposes, needed only for initiating the process. Therefore, the gas from source 37 can be shut off by valve 36 and only utilized for starting the process.

Where the gas bubbles cannot be made independently but are utilized for completing a preliminary treatment for the crystallization acceleration i.e., the reverse osmosis process, then apparatus according to FIG. 2 with its connections 31 and 32 can be connected into the apparatus of FIG. 1 immediately behind the metering device 19 and replace the crystallizer 26 and filter 27 of FIG. 1.

Figure 3:
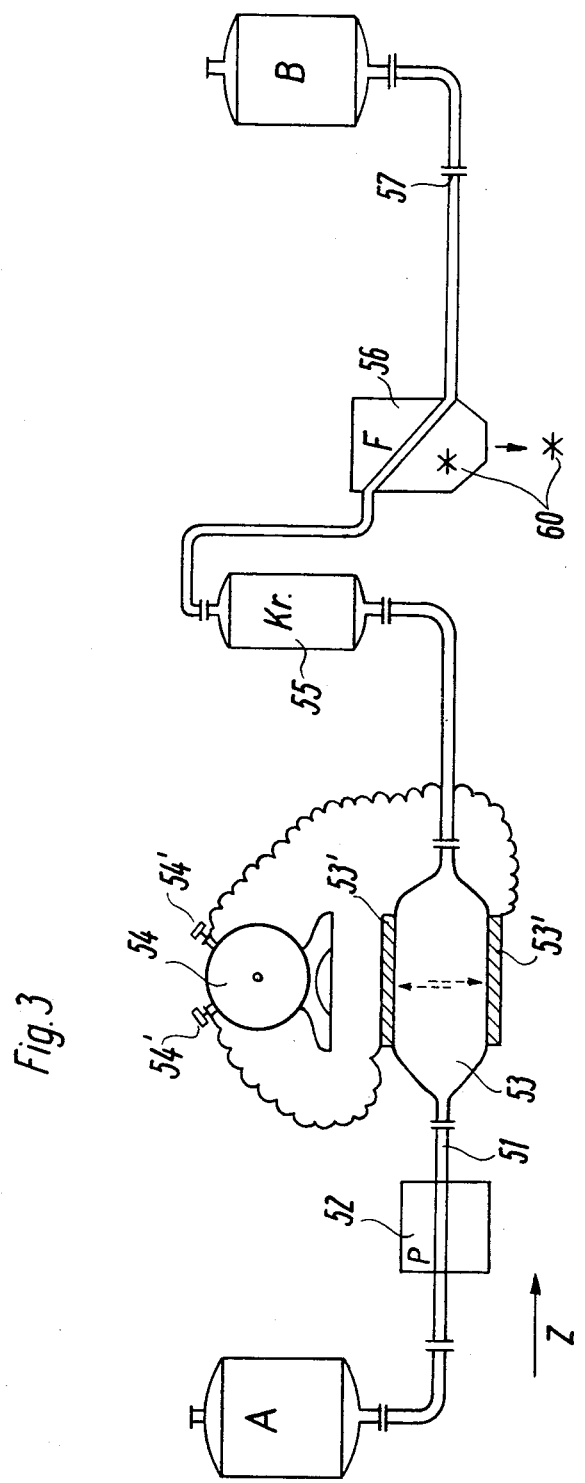
FIG. 3 is a schematic flow diagram for treating the supersaturated solution with alternating current.

FIG. 3 again illustrates containers A and B which may be of substantial size for large quantities of liquids. The flow in FIG. 3 is indicated by the arrow Z.

Container A is connected by means of coupling 51 to a pipe or similar apparatus. The supersaturated solution from container A is conveyed by means of pump 52 into a treatment conduit 53 where there are positioned on opposite sides of treatment pipe 53, two electrodes 53'. Electrodes 53' are provided with alternating current over a frequency transformer 54 from a suitable source of alternating current (not shown). The frequency of the transformer 54 is determined and adjusted by any suitable means. Current intensity can be determined while adapting the apparatus to a specific fluid. If electrodes 53' are subjected to an alternating current, an alternating field develops between the respective electrodes and has the effect on the liquid that the ions within the treatment pipe 53 are oriented in a to and fro movement in the direction indicated by the arrow Z. After passing through treatment pipe 53 the supersaturated solution is conveyed into a crystallizer 55 of suitable size. In filter 56, the crystals illustrated by the asterisk 60 will be filtered off and the liquid will flow through a conduit having connection 57 therein to container B which is connected at 57 by means of a hose or pipe to a conduit.

To create the alternating field, more than two electrodes may be employed and like the treatment pipe or conduit through which the liquids are flowing, can be attached to a container with the to be processed liquids. Another arrangement of the electrodes can be used where an axial electrode is positioned within the treatment pipe or conduit to function with an electrode surrounding the pipe.

The invention is not confined to the details shown in the drawings or the examples illustrated. The elements of the apparatus can be chosen in a suitable manner and can be adapted to the volume and properties of the supersaturated solution. Suitable conventional filters can be used, such as continuous or discontinuous filters. Apparatus according to the invention can be arranged and complete components can be installed in situ or may be transportable. The apparatus can be mounted on a vehicle to be used at different localities.

According to the provisions of the patent statutes, I have explained the principle, preferred construction and mode of operation of my invention and have illustrated and described what I now consider to represent its best embodiment. However, it should be understood that, within the scope of the appended claims, the invention may be practiced otherwise than as specifically illustrated and described.

I claim:
1. Apparatus for removing tartrate from a tartarous beverage comprising,
   a module having a semipermeable membrane for receiving said tartarous beverage at a preselected pressure from a source,
   said module operable to separate said tartarous beverage into a permeate portion of tartrate-free beverage and a concentrate portion containing a solution of said beverage and a tartrate,
   a first conduit connected to said module for removing said permeate portion from said module,
   a second conduit connected to said module for removing said concentrate portion from said module,
   a valve means positioned in said second conduit for regulating the flow rate of said concentrate portion through said second conduit, said valve means being controllable by the amount of flow through said first conduit,
   means for crystallizing said concentrate portion to form tartrate crystals having a preselected particle size, said crystallizing means connected to said second conduit,
   means communicating with said crystallizing means for filtering said tartrate crystals from said beverage in said concentrate portion, and
   a third conduit connected to said filtering means and said first conduit for admixing said permeate portion with tartrate-free beverage from said concentrate portion.

2. Apparatus for removing tartrate from a tartarous beverage as set forth in claim 1 which includes,
   a plurality of modules each having a semipermeable membrane operable to separate tartarous beverage into a permeate portion of tartrate-free beverage and a concentrate portion of a beverage and a tartrate,
   said modules each having a first outlet communicating with said first conduit for removing said permeate portion from each of said modules,
   each of said modules having a second outlet and an inlet, and
   conduit means for serially connecting said second outlet of a preceeding module with said inlet of a following module for the passage of said concentrate portion through said conduit means.

3. Apparatus for removing tartrate from a tartarous beverage as set forth in claim 2 which includes,
   pump means positioned in said conduit means for increasing the pressure of said concentrate portion at said inlet of each of said modules.

4. Apparatus for removing tartrate from a tartarous beverage as set forth in claim 2 which includes,
   a branch conduit connecting said second outlet of a downstream module to said inlet of an upstream module for recycling a portion of said concentrate portion,
   said branch conduit having valve means for regulating the flow of said concentrate portion through said branch conduit.

* * * * *